Jan. 19, 1932.  C. BETHEL  1,842,241
TRUCK STRUCTURE
Filed Jan. 25, 1928  2 Sheets-Sheet 2

INVENTOR
Claude Bethel.
BY
ATTORNEY

Patented Jan. 19, 1932

1,842,241

UNITED STATES PATENT OFFICE

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA

TRUCK STRUCTURE

Application filed January 25, 1928. Serial No. 249,263.

My invention relates to truck structures and particularly to trucks for electrically driven railway vehicles.

In my copending application, Serial No. 664,235, filed September 22, 1923, now Patent No. 1,709,704, issued April 16, 1929, I have shown a railway vehicle truck comprising a unitary motor housing and truck-frame member. In the particular structure disclosed in my earlier application, the truck-frame member is journalled on a plurality of wheel axles by means of the usual journal boxes that are disposed within pedestal jaws formed integrally with the ends of the truck frame. The journal boxes are guided by the pedestal jaws in such manner that they are free to slide vertically therein and carry the weight of the truck by means of spring elements that are interposed between the tops of the journal boxes and the upper ends of the pedestal jaws. The resiliently mounted wheel axles are each driven by a motor, mounted in the motor housing, by means of a universal-drive mechanism comprising a spherically seated flexible gear wheel and a pinion.

In constructing a vehicle structure in accordance with the design shown in the above-mentioned application, it has been found that the operation of machining the pedestal jaws required the use of special machine tools and involved considerable trouble and expense.

It is an object of my present invention to provide a railway-vehicle truck in which the motor housings and truck-frame member are formed integrally and one that is simple and inexpensive to construct.

Another object of my invention is to provide a mechanism for securing the axle bearings to railway-vehicle trucks in their proper operating relation to the truck frame and in such manner that the axles are free to oscillate relative to the truck frame when irregularities in a track over which the vehicle is moving are encountered.

A further object of the invention is to provide a railway-vehicle truck, in which the axle bearings constitute self-contained unitary structures that are disposed to support the truck frame and that may be retained in their proper operating positions relative to the truck-frame member, by any suitable retaining mechanism.

In the present invention, the journal bearings are retained in their proper operating positions by means of a link mechanism that is a parallel-motion device capable of restricting the journal bearings and the truck axle to motion in a plane extending substantially vertically and transversely of the truck frame.

Figure 1:
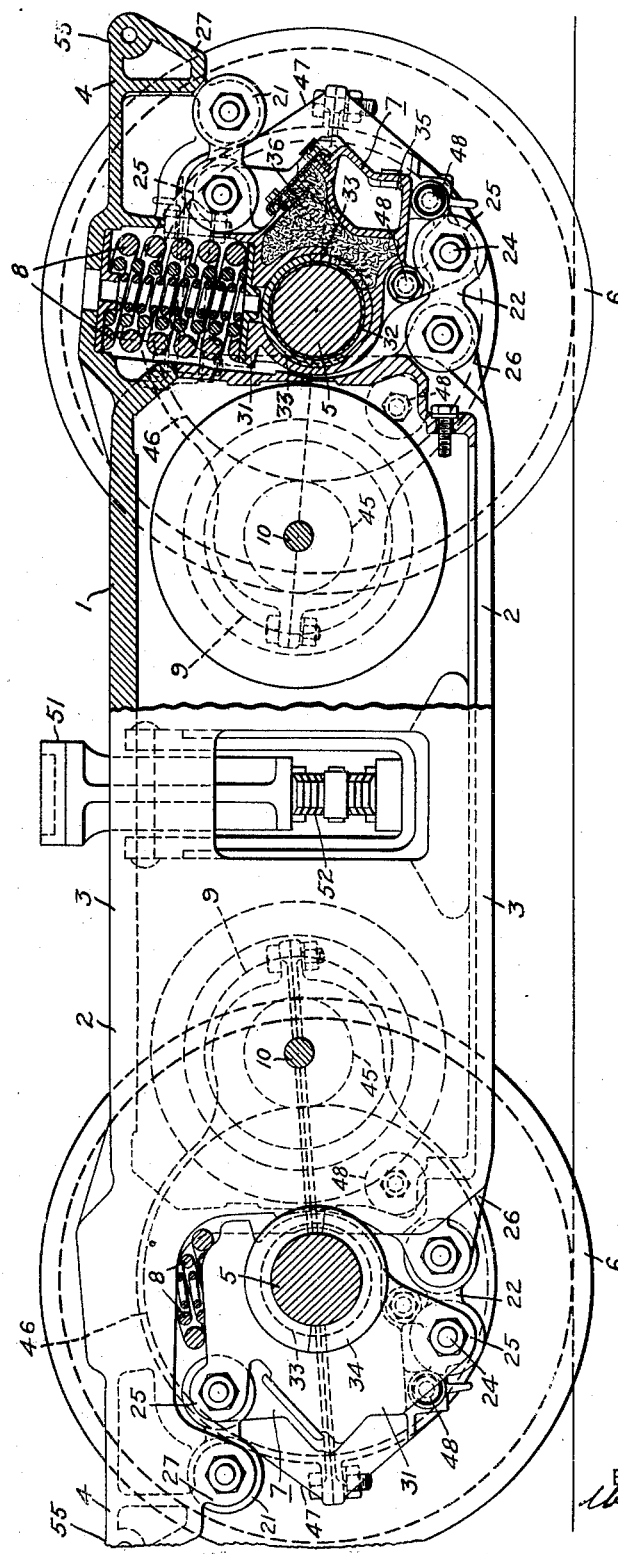
Figure 1 is a view, partially in side elevation and partially in section, of a truck structure embodying the principles of my invention.
Figure 2:
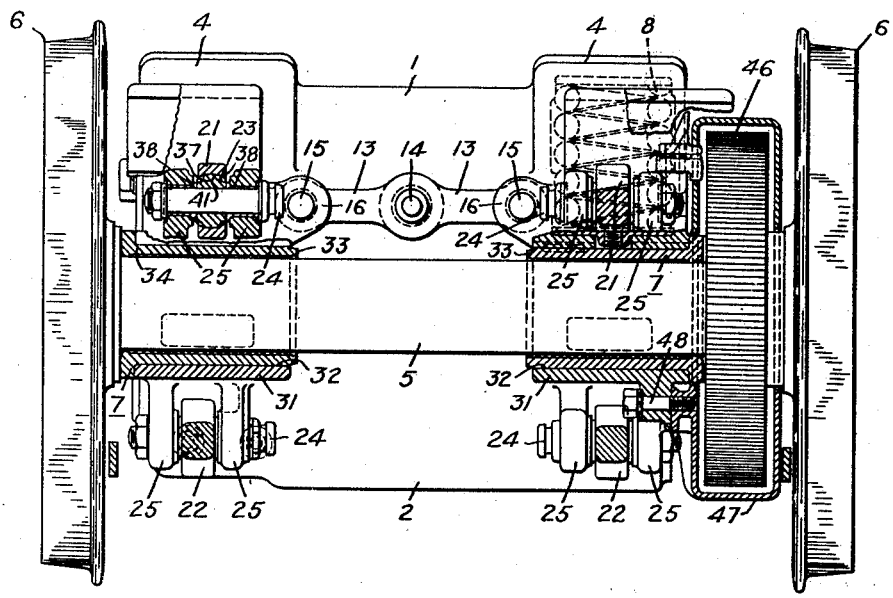
Fig. 2 is a view, partially in end elevation and partially in section, of the truck structure.

Referring to the drawings, the embodiment of the invention shown comprises a unitary motor housing and truck-frame member 1 that is made up of a pair of motor-housing portions 2 integrally joined by side-frame portions 3 and provided at each end with a pair of longitudinally projecting bracket portions 4 that are preferably formed integrally with the housing portions 2. The bracket portions 4 are disposed at substantially the corners of the truck-frame member 1 and, in the particular structure herein shown, extend parallel to the upper surface of the motor housing portion 2 to provide means for supporting the frame on a pair of wheel axles 5.

The wheel axles 5 are each provided with a pair of wheels 6 and with a pair of unitary journal bearings 7 that are disposed between the wheels and adjacent thereto in such manner that they may be placed directly beneath the bracket portions 4.

In order to support the truck frame 1, spring elements 8 are interposed between the top portion of each journal bearing 7 and the lower surface of the corresponding bracket portion 4. The spring elements shown in the drawings are of the conventional helical type.

However, any suitable type of spring structure may be utilized to provide the required resilience.

A motor armature 9, having an armature shaft 10, is disposed within each motor-housing portion 2 to drive the wheel axles 5. In order that the wheel axles 5 may be retained in their proper lateral positions, relative to the truck frame 1, links 13 are disposed between the journal bearings 7 and a pivot pin 14 that is secured to the end of the truck frame at substantially its longitudinal center. The inner ends of the links 13 are pivoted on the pin 14 and their outer ends on pins 15 that are disposed in brackets 16 on the journal bearings 7. By virtue of this pivotal connection, the journal bearings 7 are permitted to move substantially vertically upon the compression of the springs 8 but are restricted, as to lateral displacement, with respect to the truck-frame member 1.

With a view to limiting the journal bearings 7 to motion in substantially a transverse plane of the truck-frame member 1 and in proper longitudinal relation thereto, a pair of links 21 and 22 are connected to pairs of lugs 25 on the top and bottom, respectively, of each of the journal bearings 7. As shown, the links 21 and 22 are connected to the lugs 25 by means of spherically-shaped joints 23 that are provided on pins 24 that extend through aligned holes in the lugs 25. The lower link 22 is pivotally connected, at its other end, to a lug 26 that is an integral part of the truck-frame member 1 and is disposed near the corner and at the lower edge thereof. The upper link 21 extends from the journal bearing 7 in a direction away from the frame 1 and is pivoted to a lug 27 on the bracket member 4 at the end thereof farthest from the truck frame member 1. Therefore, as illustrated in Fig. 1, the links 21 and 22 constitute a parallel-motion mechanism that restricts the journal bearing 7 to motion in substantially a vertical plane, in which the axis of the wheel axle 5 lies.

The journal bearings 7 each comprise a single integral casting in the form of a housing 31 having a cylindrical opening 32 forming a bearing collar for receiving a bearing sleeve or liner 33. The bearing sleeve 33 is divided longitudinally into two parts or halves that are disposed to be fitted together about the axle 5 and pressed into the cylindrical opening 32 in the housing 31. A thrust-bearing surface 34 is provided at the end of each bearing sleeve 33 adjacent the wheels 6 to take the end thrust of the axle 5.

The bearing housing 31 is further provided with a lubricating system comprising an oil reservoir 35 and a wick chamber 36 that may be constructed in any suitable manner but preferably to embody the principle of oil-sealed lubrication that is disclosed in Patent No. 1,535,560, issued to Claude Bethel and Edwin Tidlund and assigned to the Westinghouse Electric and Manufacturing Company.

The ball-and-socket joints 23 comprise ball members 37 that are clamped between collars 38 provided on the pin 24 that extends through the lugs 25 cast on the top of the housing 31 in such manner that the whole constitutes a rigid bearing. The ends of the links 21 and 22 are provided with suitable sockets 41 for engaging the ball members 37.

In case it becomes desirable to remove the bearing sleeves 33, the truck-frame member 1 is first raised, by means of jacks or other suitable tools, to remove its weight from the journal bearings 7. The links 13 and the links 21 and 22 may then be disconnected from the journal bearing 7 and the axle 5 rolled away from the frame 1 to permit the housing 31 to be moved toward the center line of the truck frame 1, leaving the bearing sleeves 33 in their normal position. After the housing 31 has been removed from the bearing sleeve 33, the two halves of the bearing sleeve may be separated and removed from the shaft 5. New bearing sleeves may then be placed in position on the axle shaft 5 and the bearing housing 31 moved into position to secure them in place.

Figure 3:
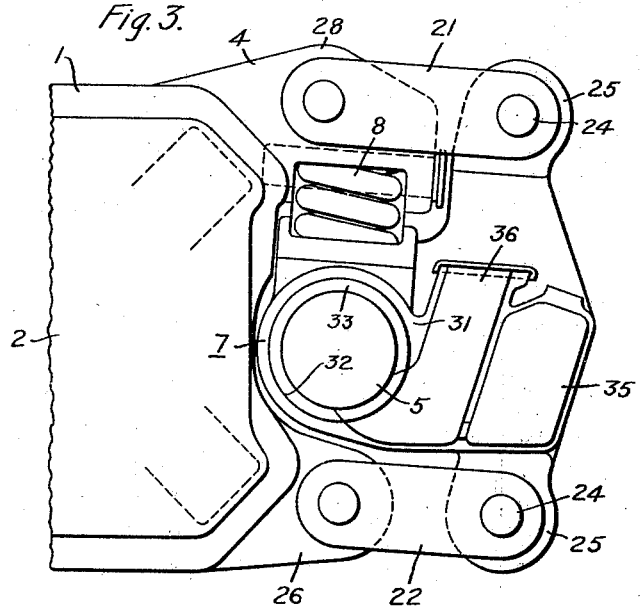
Fig. 3 is a view, in side elevation, of a modified form of link mechanism for restraining the movement of the axle bearings relative to the truck frame.

In the modification of the link mechanism shown in Fig. 3, the lower link 22 is pivoted to a lug 26 on the frame 1 and to a lug 25 on the journal bearing 7 in much the same manner as shown in Fig. 1. However, the upper link 21 extends from the journal bearing 7 toward the frame 1 and is pivoted to a lug 28 that is disposed substantially directly above the lug 26 and at the top of the frame 1. It is evident that this mechanism is adapted to guide the journal bearing 7 along a path that is substantially an arc of a circle. By properly adjusting the length of the links 21 and 22, the axle 5 may be guided in such manner that substantially the same distance may be maintained at all times between the axle 5 and the motor-armature shaft 10.

This result may be accomplished by making the links 21 and 22 of a length equal to the distance between the centers of the axle 5 and the motor-armature shaft 10.

Another method of securing substantially correct center distance between the axle 5 and the shaft 10 is to so proportion the relative lengths of the links 21 and 22 and dispose them relative to the axle 5, as shown in Fig. 3, that the axle 5 will be restricted to motion along a curved path that will closely approximate an arc of a circle having its center at the center of the shaft 10.

In order to transmit power from the motor armatures 9 to the wheel axles 5, gear drive mechanism are provided, each comprising a pinion 45 mounted on one of the armature shafts 10 and a gear wheel 46 for cooperating therewith that is mounted on the corresponding wheel axle 5.

The gear wheels 46 are so constructed that they permit relative motion between the axles 5 and the armature shafts 10 without disturbing the normal gear-tooth alignment between the teeth of the gear wheel and those of the pinion 45.

For protecting the gear train from foreign matter and to provide a lubricating chamber, a gear case 47 is provided. The gear case is rigidly secured to one of the axle bearings 7 by means of bolts 48 and is disposed to move relative to the armature shaft 10 and the pinion 45.

A bolster 51 of the usual type is provided at the center of the truck frame for receiving a car body (not shown). The bolster 51 is resiliently supported upon a spring 52 that is disposed between the two motor-housing portions 2.

Brackets 55 are provided at the extreme ends of the brackets 4 and constitute means for supporting the usual brake rigging (not shown).

From the foregoing, it will be seen that the invention provides an integral railway-vehicle truck-structure that is of simple and rugged construction and that may be readily manufactured without resorting to expensive and difficult machining operations upon the integral truck frame.

Although I have described a specific embodiment of my invention, it will be obvious to those skilled in the art that various modifications may be made in the details of construction and in the arrangement of the cooperating parts without departing from the spirit and scope of the invention as defined in the appended claims.

I claim as my invention:

1. A railway-vehicle truck comprising a unitary motor-housing and truck-frame member, a pair of truck axles for supporting the frame, a pair of self-contained journal-boxes on each axle, spring elements for supporting the frame on the journal-boxes and a link mechanism for connecting the journal-boxes to the truck frame and for preventing lateral displacement relative thereto.

2. A railway-vehicle truck comprising a truck frame, wheel axles for supporting the truck frame, journal boxes on the wheel axles, spring elements interposed between the journal boxes and the truck frame, a link mechanism for securing the journal boxes to the truck frame and spherically seated joints for connecting the link mechanism to the journal boxes, said link mechanism being disposed to permit the truck axle to move relative to the frame.

3. In a railway vehicle, a wheel axle, a pair of unitary journal boxes carried by the wheel axle, a truck frame, resilient means for supporting the truck frame on the journal boxes, a link mechanism for connecting the journal boxes to the truck frame and spherically seated joints for connecting the link mechanism to the journal boxes in such manner that the wheel axle is permitted to move relative to the frame in response to the deflection of the resilient supporting means.

4. A truck structure for railway vehicles comprising a plurality of wheel axles, a pair of journal boxes mounted on each axle, a truck structure resiliently mounted on the journal boxes, a pair of links disposed substantially parallel to each of the wheel axles for restraining the journal boxes from lateral displacement relative to the truck frame and means for restraining the journal boxes longitudinally.

5. In a railway vehicle, a wheel axle, a pair of unitary journal boxes carried by the wheel axle, a truck frame, resilient means for supporting the truck frame on the journal boxes, link mechanism for connecting the journal boxes to the truck frame and spherically seated joints for connecting the link mechanism to the journal boxes.

6. A railway vehicle comprising wheel axles, journal boxes on each of the wheel axles, an integral motor-housing and truck-frame member carried by the journal boxes, and a parallel motion link mechanism for positioning the journal boxes relative to the integral truck frame, said link mechanism constituting the only positive connection between the journal boxes and the truck frame.

7. A railway vehicle comprising a frame, wheel axles for carrying the frame, a pair of journal boxes on each of the wheel axles, resilient means for supporting the frame on the journal boxes, and a parallel motion link mechanism for positioning the journal boxes relative to the frame, said link mechanism constituting the only restraining connection between the journal boxes and the frame.

8. A railway-vehicle truck comprising a plurality of wheel axles, a pair of journal boxes mounted on each axle, a truck structure resiliently mounted on the journal boxes, connecting links disposed substantially parallel to each of the wheel axles for restraining the journal boxes from lateral displacement relative to the truck frame, and connecting links disposed transversely of the wheel axles for restraining the journal boxes longitudinally.

In testimony whereof, I have hereunto subscribed my name this 23rd day of January, 1928.

CLAUDE BETHEL.